United States Patent Office 3,090,815
Patented May 21, 1963

3,090,815
ISOMERIZATION OF ALKYLENE OXIDE
William I. Denton, Cheshire, Conn., assignor to Olin Mathieson Chemical Corporation, New Haven, Conn., a corporation of Virginia
No Drawing. Filed June 8, 1959, Ser. No. 818,516
6 Claims. (Cl. 260—632)

This invention relates to the catalytic conversion of gaseous alkylene oxide containing 3 to 5 carbon atoms to an isomeric alcohol, for example, propylene oxide to allyl alcohol, and particularly to an improved process therefor using a highly efficient catalyst rendered suitable for use by a novel treatment with liquid solvent.

In this type of process, the prior art catalysts have been characterized by insufficient extents of conversion and inadequate production capacity to make them commercially attractive. Thus, the trilithium phosphate catalyst of U.S. 2,426,264 was disclosed as resulting in the conversion at each pass of only about 17 to 21% of the propylene oxide feed to allyl alcohol, at production rates of 60 to 179 grams of allyl alcohol per liter of catalyst per hour.

The main object of this invention has been to provide a catalytic process for the conversion of propylene oxide to allyl alcohol using an efficient catalyst which is capable of activation to produce a high extent of conversion at each cycle and characterized by large productive capacities and high ultimate yields of allyl alcohol from the propylene oxide feed.

A further object has been to provide a novel method of activating a relatively inactive catalyst to high efficiency in the above type of isomerization process.

The foregoing and other objectives have been accomplished in that extents of conversion of oxide to alcohol in each cycle of 60% to about 85% with ultimate yields of 83% to 95%, and production rates of 250 to about 550 grams of alcohol per liter of activated catalyst per hour have been attained. Furthermore, such efficiency has been restored by the activation process of this invention to catalysts whose activity had been decreased by use.

Highly effective catalysts for this type of conversion comprise leached basic lithium phosphate as described in detail in copending application Ser. No. 803,792, filed April 2, 1959, now U.S. Patent 2,986,585 issued May 30, 1961. The preparation involves the precipitation of a basic lithium phosphate, preferably by double decomposition in the presence of at least 0.2 mole, preferably 1 to 2 moles of alkali metal hydroxide or other basic compound per mole of lithium orthophosphate. The precipitate is then leached three to five times with a large volume of water, preferably at a temperature of 50° to 95° C. The resulting highly effective leached basic lithium phosphate catalyst has essentially a composition corresponding to lithium orthophosphate, but contains residual excess alkali metal hydroxide or other basic compound equivalent to 0.05 to 1% by weight of the alkali metal.

In the evaluation of catalysts prepared by various methods for use in the isomerization of an alkylene oxide to the corresponding unsaturated alcohol, the activity of the catalyst is measured by the extent of conversion of oxide to alcohol per pass through the reactor. Thus, a fairly active catalyst results in over 40% conversion and a catalyst of excellent activity can result in the conversion of up to about 85% of the oxide to alcohol for each pass through the catalyst bed.

The selectivity of the catalyst is likewise of great importance in view of the possibility of other conversions, it being well known for example that alkylene oxides can be isomerized to aldehydes as well as other carbonyl compounds. The occurrence of such side reactions results in the consumption of the starting alkylene oxide to products other than the desired alcohol. With the use of a highly selective catalyst, such side reactions are suppressed, so that unconverted alkylene oxide can be recovered and again passed through the reactor, resulting in ultimate yields of alcohol as high as over 90% to 95% of the starting oxide. The ultimate yield, which is thus a measure of the selectivity of the catalyst can be determined by dividing the weight of alcohol obtained by the weight of oxide consumed (weight of recovered oxide subtracted from the weight passed through the reactor) or, generally more conveniently, by dividing the weight of the alcohol product by the total weight of all products other than recovered oxide. For commercial success, the catalyst should be sufficiently selective as to result in ultimate yields of the desired alcohol product amounting to over 80 to 95%, preferably over 85%.

The improved process using the leached basic lithium phosphate catalyst provides excellent results at reaction temperatures within the range of about 250° to 350° C., preferably at about 275° C. to 300° C.

The rate of feed of liquid alkylene oxide may be varied from space velocities of about 0.3 to 2.0, preferably 0.5 to 1.0. Space velocity is defined herein as the volume of liquid feed per hour divided by the volume occupied by the catalyst. Residence time in the reaction zone within the above range amounts to about 2 to 50 seconds.

The catalyst will undergo a gradual decrease in activity with extended use. However, the selectivity of the present catalyst is not significantly impaired even after extended use, so that the ultimate yield of the desired alcohol remains high. Thus, while frequent regeneration is not essential, it is generally economical to restore the activity by suitable treatment when the conversion per pass had decreased to a value of 30 to 45%. Such a point may be reached after use of the catalyst for 24 to 48 hours or, expressed differently, after the catalyst has converted about 10 to 15 times its weight of oxide to alcohol.

In accordance with this invention, catalysts of initially inadequate effectiveness or which have been somewhat inactivated by use may readily be made highly effective by treatment, generally at an elevated temperature within the range of about 50° to 250° C. with an aqueous liquid such as water or an aqueous solution of a liquid oxygen-containing polar organic solvent such as acetone, propylene oxide, methyl alcohol, ethyl alcohol, ethyl acetate and dioxane. Catalysts may be recycled in this way many times and still display the high original activity and selectivity, and in fact, may even be somewhat improved after such regeneration.

It is noteworthy that attempts to activate or regenerate by heating the catalyst in air, or air mixed with oxygen or steam, or oxygen mixed with steam, as disclosed in U.S. 2,426,264, have been unsuccessful when applied to catalyst of initially high effectiveness. For example, a leached basic lithium phosphate catalyst which displayed an initial activity of 61 (61% of the propylene oxide passed once through the catalyst bed was converted to allyl alcohol) and a selectivity of 85 (85% of the propylene oxide passed cyclically through the catalyst bed yielded allyl alcohol in the product) was used in the process until the activity and selectivity had decreased, respectively, to 43 and 80. The catalyst was then heated for 16 hours in a current of air with the bed temperature regulated at 350° C., resulting in peak temperatures within the bed of 375° C. The so-treated catalyst was then found to be characterized by decreased activity and selectivity of 29 and 62, respectively. Similarly, a catalyst was used for 50 hours and suffered a loss in activity from 65.2 to 37.1 and in selectivity, from 86 to 82. Treatment thereof with air at 290° C. for 60 hours, and then at 315° C. for 3 hours effected a further decrease in the activity to 34.7 and in the selectivity to 59, rather than regeneration to increase the effectiveness.

It has now been shown that treatment of the catalyst with an aqueous liquid results in the restoration of the original effectiveness of the catalyst prior to any fouling thereof through use in the isomerization process, or in the imparting of even greater effectiveness. Also, the present activation process has been found to increase the effectiveness of lots of freshly prepared catalyst which do not display the desired high efficiency. The present activation process is also advantageously used to restore lots of catalyst which had previously been regenerated a number of times with an oxygen-containing solvent, as disclosed in copending application Ser. No. 818,557, filed of even date herewith.

Although pure water in the liquid state is effective, it is at times advantageous to use an aqueous solution containing up to 70% by weight of a polar organic solvent. Examples are organic oxygen-containing saturated aliphatic compounds such as oxides, ketones, aldehydes, ethers, alcohols, acids and esters. The preferred liquids are oxides such as propylene oxide, butylene oxide, and amylene oxide, and ketones such as acetone, methyl ethyl ketone, methyl propyl ketone and cyclohexanone. Suitable ethers are diethyl ether, dipropyl ether, and dioxane. Examples of useful alcohols are methyl, ethyl, n-propyl, isopropyl, butyl, hexyl and cyclohexyl alcohols and also polyhydric alcohols such as ethylene glycol and glycerine. Lower fatty acids such as acetic, propionic and butyric acid are effective, as are also the lower alcohol esters thereof such as methyl acetate, ethyl propionate, and butyl acetate. Suitable aldehydes are propionaldehyde, butyraldehyde and benzaldehyde.

Substantial improvement of the catalyst results after treatment with the aqueous liquid at elevated temperatures up to about 300° C., generally within 50° to 250° C., the preferred range being 100°–200° C. At temperatures above the normal boiling point of the aqueous liquid, which may extend up to about 25° C. below the critical temperature, pressures sufficiently greater than atmospheric must be used so as to maintain the solvent in the liquid phase.

The best operating temperature for a particular aqueous solution will depend somewhat on the proportion used and on the extent of inactivation of the catalyst. Generally, the higher the temperature of treatment within the above preferred range, the smaller is the proportion of liquid required for adequate regeneration and the longer the useful life of the regenerated catalyst in the isomerization process.

The proportion of aqueous liquid to catalyst under treatment may be varied for effective results between rather wide limits depending largely on the extent of fouling. Generally 1 to 15 volumes of liquid are used per volume of catalyst, preferably 2 to 10 volumes under usual operating conditions. However, higher volume ratios may be desirable at times, as when a catalyst has been extensively fouled by use for 100 hours or more, in which case the use of 30 volumes of aqueous liquid per volume of catalyst may be desirable.

The treatment is generally applied by pumping fresh liquid through the catalyst, generally for 2 to 10 hours. The volume ratio may be reduced to less than 5 volumes of liquid per volume of catalyst when the latter has been used in the process for periods not exceeding 48 hours or by recirculating the liquid. Lower volume ratios are also used when the regeneration is carried out by a customary extraction procedure wherein the treating liquid is distilled from the extract, condensed and caused to flow through the catalyst.

The regeneration is most practically effected without removing the catalyst bed from the isomerization apparatus, the activating aqueous liquid being caused to pass through the catalyst bed while the latter is maintained in position. Thus, any need for dismantling the isomerization apparatus and the removal of catalyst is avoided. Also, the required activation temperature is readily controlled by the regulatable heating units available in the chamber housing the catalytic bed.

When an aqueous solution is used, it is preferably one of an oxygen-containing organic solvent containing not more than six carbon atoms, in proportions up to 70% by weight forming a homogeneous solution at the temperature of treatment. Such liquids have the required activating effect and are readily removed from the catalyst by volatilization after the treatment has been completed by lowering the pressure and, if necessary, by passing a stream of gas, for example, air, nitrogen or carbon dioxide through the catalyst. Less volatile oxygen-containing liquids, containing more than six carbon atoms, may be used for the activating treatment, although generally requiring an additional step for removal. In such cases, following the treatment, the liquid is removed from the catalyst by washing thoroughly with water or other volatile solvent, and the latter is subsequently removed by volatilization.

In the following illustrative examples, catalysts were evaluated for effectiveness by passing propylene oxide through a bed containing 120 grams thereof at a temperature of 275° C., at atmospheric pressure and at a space velocity of 0.5, the product being analyzed for its content of allyl alcohol, recovered propylene oxide, and other carbonyl-containing compounds.

*Example 1*

A leached basic lithium phosphate catalyst, when initially tested in the isomerization of propylene oxide to allyl alcohol, was found to display an activity of 62.3 (62.3% of the propylene oxide was converted to allyl alcohol per pass through the catalyst bed) and a selectivity of 85 (85% ultimate yield of allyl alcohol).

The catalyst was then used in the isomerization process for five successive runs of 24 to 48 hours' duration, being regenerated after each run by treatment with 10 volumes of liquid acetone at 125° C. to 200° C. to restore essentially the initial effectiveness.

The catalyst was then used in the isomerization process for 350 hours without regeneration, the effectiveness decreasing to an activity value of 5 and a selectivity value of 45.

Treatment with liquid acetone, as above, increased the effectiveness only to an activity of 20 and selectivity of 72. A second regeneration treatment with acetone increased the values but slightly to an activity of 27 and selectivity of 75.

Then, the catalyst was treated with liquid water at 170° C. and at a pressure of 300 pounds per square inch above atmospheric, passing liquid water through the bed at a rate of 10 cc. per minute for two hours.

The catalyst was restored by this treatment to an activity of 60 and a selectivity of 85.

*Example 2*

A leached basic lithium phosphate catalyst, initially characterized by an activity of 60 and a selectivity of 83, was used for 100 hours in the isomerization of impure propylene oxide, containing a catalyst poison, to allyl alcohol. This resulted in greatly reduced effectiveness of the catalyst to an activity of 17 and selectivity of 59.

Treatment with 4 cc. of pure liquid propylene oxide per minute for two hours at 125° C. and at a pressure of 300 p.s.i.g. increased the activity only to 36.6 and the selectivity to 75.

The catalyst was then treated with a 1:1 liquid mixture by weight of water and propylene oxide at 150° C.

and at a pressure of 300 p.s.i.g., passing the aqueous liquid through the catalyst at a rate of 6 cc. per minute for 2 hours. The catalyst then displayed an activity of 65.2 and a selectivity of 86.

*Example 3*

A catalyst which had been deactivated as in Example 1 to an activity of 45 and selectivity of 82 was treated with an aqueous liquid consisting of 60% by weight ethyl alcohol and 40% by weight of water at 100° C. and at a pressure of 200 p.s.i.g. The liquid was passed through the bed of catalyst at the rate of 5 cc. per minute for 2.5 hours. The catalyst was then found to be restored to an activity of 63.5 and a selectivity of 84.

*Example 4*

A catalyst which had been deactivated as in Example 2 to an activity of 48 and a selectivity of 84 was treated with 50% by weight solution of acetone in water at 125° C. and at a pressure of 300 p.s.i.g. The liquid was passed through the catalyst at a rate of 4 cc. per minute for 2 hours. The resulting catalyst was restored to an activity of 65.8 and a selectivity of 85.

*Example 5*

A leached basic lithium phosphate catalyst, characterized by an initial activity of 71.5 and selectivity of 89, was used in the isomerization process for 19 hours. The activity had decreased to 65.4 and the selectivity was unchanged.

The catalyst was then treated with a 50% by weight solution of acetone and water at 150° C. and at a pressure of 300 p.s.i.g. The aqueous liquid was passed through the catalyst at a rate of 8 cc. per minute for 105 minutes, resulting in catalyst having an activity of 75.4 and selectivity of 88.

Likewise, beneficial activating effect results from the treatment of catalyst with aqueous solutions of other oxygen-containing organic solvents as specified above. It will be understood that the aqueous activating liquid may contain two or more such solvents. For example, the aqueous liquid may contain ethyl or methyl alcohol or acetone combined with propylene oxide or propionaldehyde or both.

When water is used as the activating liquid, or the aqueous liquid contains a high proportion of water, a small fraction of the catalyst is dissolved therein at the elevated temperature of treatment. Indeed, the activating effect may be due at least in part to the dissolving of some catalyst, resulting in the exposure of fresh surfaces thereof, as well as to the re-exposure of surface areas by the removal of organic deposits therefrom. When appreciable amounts of catalyst are dissolved by the aqueous liquid, precautions must be observed to prevent the clogging of lines by re-precipitated catalyst, as by maintaining the temperature of the liquid while it is circulated.

It should be noted, also, that best results are generally obtainable when the aqueous liquid comprises water free of added electrolyte, such as distilled water or water which has beeen demineralized by ion-exchange treatment. This precaution avoids the possibility of causing the deterioration of catalyst such as might result from the presence of added anions or cations. The organic are readily obtainable substantially free of electrolytes or may be purified by distillation, if necessary.

The activation process of this invention is likewise advantageous for the treatment of catalyst for the isomerization of butylene oxide and amylene oxide, particularly the 1, 2 oxides, to the corresponding isomeric alcohols.

Modifications in the above detailed procedures will be apparent to those skilled in the art and are included within the scope of the following claims.

What is claimed is:

1. In the isomerization of an alkylene oxide containing 3 to 5 carbon atoms to the corresponding alcohol,
   wherein said oxide is contacted in the gaseous state with a leached basic lithium phosphate catalyst at a temperature of about 250° C. to 350° C.,
   said catalyst initially having an activity effecting more than 40% conversion in a single pass and gradually decreasing in effectiveness during use,
   and wherein the said isomerization is interrupted for catalyst activation,
   the process of restoring substantially the initial catalyst activity consisting essentially of contacting the catalyst after use in said isomerization with an aqueous liquid consisting essentially of at least 30% by weight of water and up to 70% by weight of a saturated aliphatic solvent composed of oxygen, hydrogen and up to six carbon atoms, selected from the group consisting of ethers, oxides, ketones, aldehydes, acids, alcohols and esters,
   at a temperature of about 50° to 250° C. and at a pressure sufficient to maintain said aqueous liquid in the liquid phase, and removing the aqueous liquid from the said catalyst.

2. In the isomerization of propylene oxide to allyl alcohol,
   wherein said oxide is contacted in the gaseous state with a leached basic lithium phosphate catalyst at a temperature of about 250° C. to 350° C.,
   said catalyst effecting more than 40% conversion in a single pass and gradually decreasing in effectiveness during use,
   and wherein the said isomerization is interrupted for catalyst activation,
   the process of restoring substantially the initial catalyst activity consisting essentially of contacting the catalyst after use in said isomerization with an aqueous liquid consisting essentially of at least 30% by weight of water and up to 70% by weight of a saturated aliphatic solvent composed of oxygen, hydrogen and up to six carbon atoms, selected from the group consisting of ethers, oxides, ketones, aldehydes, acids, alcohols and esters,
   at a temperature of about 100° to 200° C. and at a pressure sufficient to maintain said aqueous liquid in the liquid phase, and removing the solvent from the said catalyst.

3. The process of claim 2, wherein the catalyst is contacted with 1 to 15 volumes of said aqueous liquid per volume of said catalyst.

4. The process of claim 2, wherein said aqueous liquid consists essentially of about equal parts by weight of water and acetone.

5. The process of claim 2, wherein said aqueous liquid consists essentially of about equal parts by weight of water and propylene oxide.

6. The process of claim 2, wherein said aqueous liquid consists essentially of about equal parts by weight of water and ethanol.

References Cited in the file of this patent

UNITED STATES PATENTS

| | | |
|---|---|---|
| 2,426,264 | Fowler et al. | Aug. 26, 1947 |
| 2,784,238 | Jacobs | Mar. 5, 1957 |
| 2,881,220 | Griffin et al. | Apr. 7, 1959 |